United States Patent
Blais et al.

(10) Patent No.: US 10,330,544 B2
(45) Date of Patent: Jun. 25, 2019

(54) AUTOMATED TEST STRIP PEENING

(71) Applicant: Pratt & Whitney Canada Corp., Longueuil (CA)

(72) Inventors: Mario Blais, Varennes (CA); Martin Blanchet, Beloeil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 579 days.

(21) Appl. No.: 14/664,152

(22) Filed: Mar. 20, 2015

(65) Prior Publication Data
US 2016/0273984 A1    Sep. 22, 2016

(51) Int. Cl.
*G01L 5/00* (2006.01)
*B24C 1/10* (2006.01)

(52) U.S. Cl.
CPC ............... *G01L 5/0052* (2013.01); *B24C 1/10* (2013.01)

(58) Field of Classification Search
CPC ........... B24C 7/0053; B24C 1/10; B24C 9/00; G01L 5/0052
See application file for complete search history.

(56) References Cited

U.S. PATENT DOCUMENTS

| | | |
|---|---|---|
| 5,172,580 A | 12/1992 | Thompson |
| 5,204,826 A | 4/1993 | Thompson et al. |
| 5,235,517 A | 8/1993 | Thompson et al. |
| 5,293,320 A | 3/1994 | Thompson et al. |
| 6,694,789 B2 | 2/2004 | Yamamoto et al. |
| 6,957,568 B2 | 10/2005 | Bron |
| 7,385,392 B2 | 6/2008 | Schlicker et al. |
| 7,812,601 B2 | 10/2010 | Goldfine et al. |

FOREIGN PATENT DOCUMENTS

CA    2876806 A1 *  7/2016  ........... B24C 7/0053

* cited by examiner

*Primary Examiner* — Robert K Carpenter
(74) *Attorney, Agent, or Firm* — Norton Rose Fulbright Canada LLP

(57) ABSTRACT

A system for assessing a calibration of a shot-peening apparatus using a part in a shot-peening session, comprising an intensity calculator for receiving real-time pressure data from at least one sensor positioned adjacent the part in the shot-peening session, and for calculating the intensity from the pressure data. A shot-peening parameter comparator compares the calculated intensity with a shot-peening intensity threshold range for the at least one sensor. A calibration assessor confirms a calibration of the shot-peening apparatus when the calculated intensity is within the shot-peening intensity threshold range for the at least one sensor. A method for assessing a calibration of a shot-peening apparatus is also provided.

20 Claims, 2 Drawing Sheets

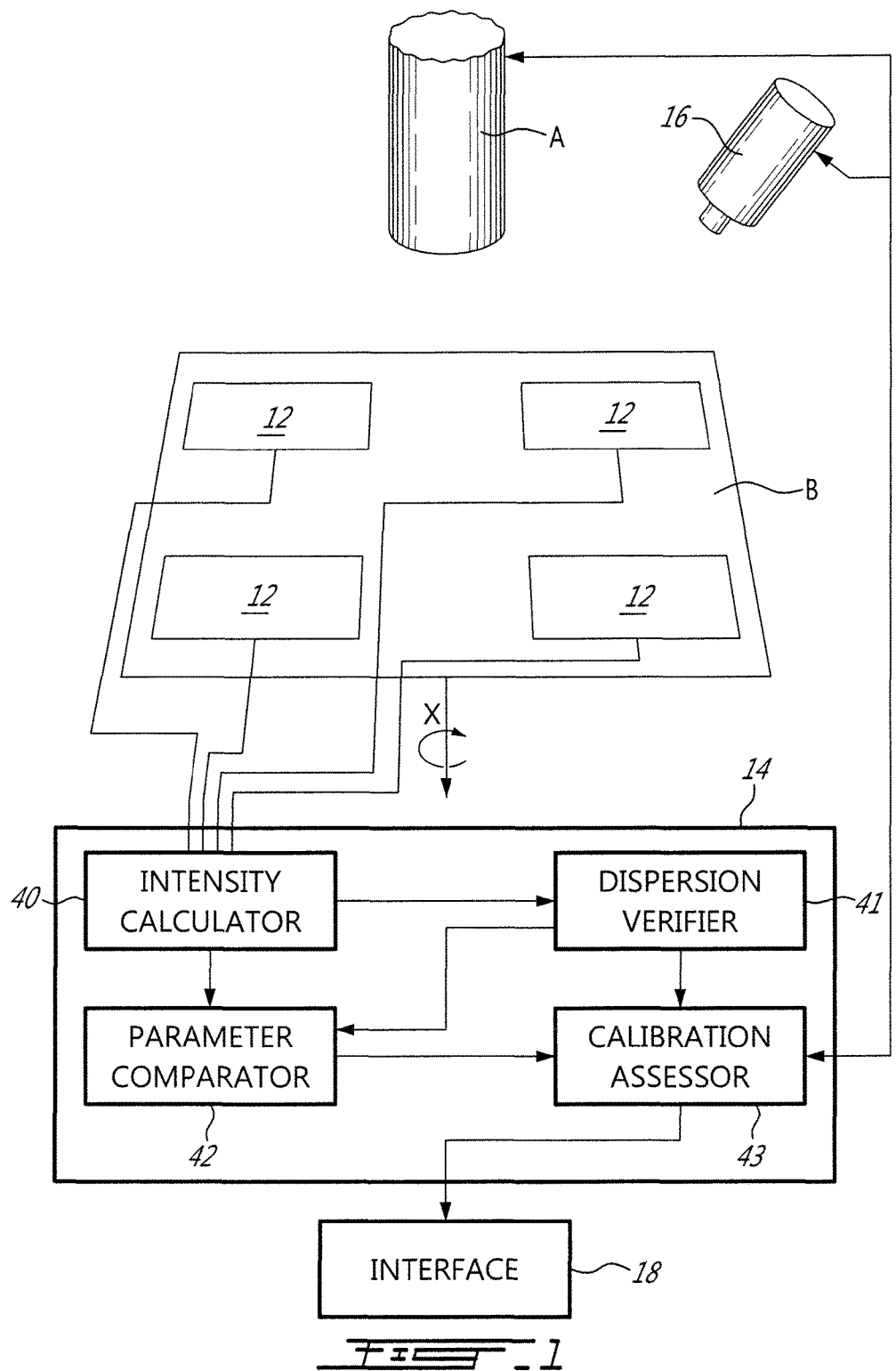

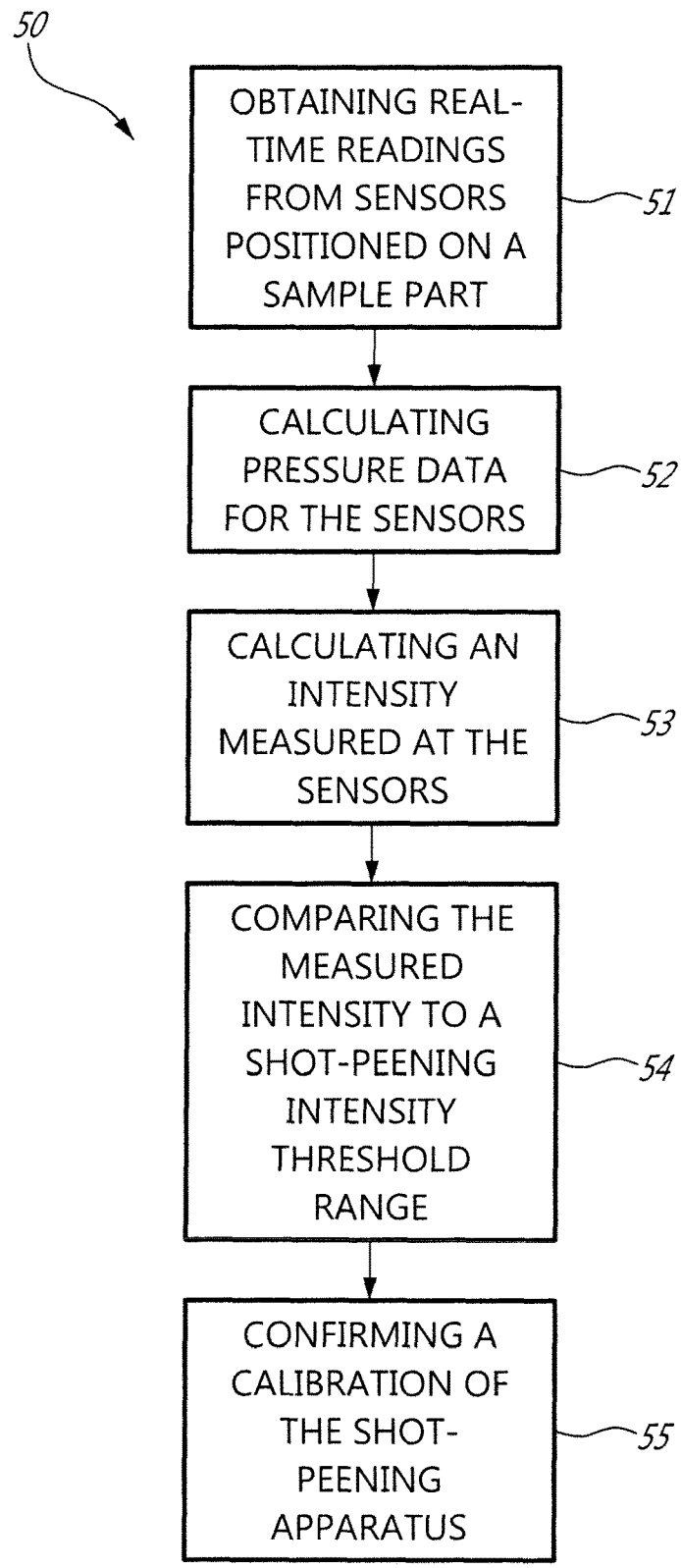

AUTOMATED TEST STRIP PEENING

TECHNICAL FIELD

The present application relates to shot peening and to the calibration of shot peening equipment for producing parts according to given specifications.

BACKGROUND OF THE ART

Shot peening is commonly used as a cold working process to alter the properties of parts. Shot peening involves impacting surfaces with shot media with a force sufficient to create the plastic deformation of the part.

As shot peening typically involves a jet producing a jet stream to propel shot media on a surface, some calibration is required in order to produce parts according to specifications. Shot peening calibration involves assessing parameters or factors such as velocity of the shot media, dispersion or coverage and pattern. Indeed, because the plastic deformation resulting from shot peening affects the near surface microstructure and near surface residual stresses, and eventually the material fatigue life, the relationship between the shot peening parameters and the near surface quality may be important for acceptable part life, especially in industries such as the aerospace industry.

Current methods to calibrate shot peening equipment may require many trials and tests. Opportunities for improvement exist.

SUMMARY

Therefore, in accordance with the present disclosure, there is provided a method for assessing a calibration of a shot-peening apparatus, comprising: obtaining real-time pressure data from or based on data received from at least one sensor positioned on a sample part during a shot-peening session; calculating a shot-peening intensity from the pressure data; comparing the calculated intensity to a shot-peening intensity threshold range for the at least one sensor; and confirming a calibration of the shot-peening apparatus when the calculated intensity is within the shot-peening intensity threshold range for the at least one sensor.

Further in accordance with the present disclosure, there is provided a system for assessing a calibration of a shot-peening apparatus using a part in a shot-peening session, comprising: an intensity calculator for receiving real-time pressure data from at least one sensor positioned adjacent the part in the shot-peening session, and for calculating the intensity from the pressure data; a shot-peening parameter comparator for comparing the calculated intensity with a shot-peening intensity threshold range for the at least one sensor; and a calibration assessor for confirming a calibration of the shot-peening apparatus when the calculated intensity is within the shot-peening intensity threshold range for the at least one sensor.

DESCRIPTION OF THE DRAWINGS

Reference is now made to the accompanying figures, in which:

FIG. 1 is a schematic view of an assembly of a shot-peening apparatus, sample part, sensors and a system for assessing a calibration of the shot-peening apparatus in a shot-peening session, in accordance with the present disclosure; and FIG. 2 is a flow chart of a method for assessing a calibration of a shot-peening apparatus in accordance with the present disclosure.

DETAILED DESCRIPTION

Referring to FIG. 1, an assembly for assessing a calibration of a shot-peening apparatus A (shown as the shot output jet or nozzle) using a sample part B in a shot-peening session is generally shown at 10. The schematically illustrated assembly is one in which the sample part B is relatively flat and fixed relative to the shot-peening apparatus A. However, there may be some relative movement between the apparatus A (axis X, Z and angles a, b) and the sample part B, such as a rotation on c axis of the sample part B on axis Y, for a moving position of the apparatus A. Hence, any positioning step may be automated. In an embodiment, the sample part B may be the same as a batch of parts that are each to be exposed to a shot-peening session with the apparatus A—i.e., the shot-peening session being defined as the shot-peening executed over a period of time for a single part or single set of part. The shot-peening sessions being repeated for all parts of the batch. Hence, the sample part B is positioned in a reproducible way relative to the apparatus A, for instance by a chuck, a clamp, etc. Accordingly, once the apparatus A is deemed to be calibrated, the rest of the batch of parts may undergo shot-peening sessions by being positioned in the reproducible way relative to the apparatus A, with the settings of the apparatus A being set at the outset of the calibration.

The assembly 10 comprises one or more electronic pressure sensors 12 disposed at various locations on the part B. The pressure sensors 12 are for example pressure transducers that are relatively thin and designed to be fixed to a surface of the sample part B. By being thin, the impact force of shot media thereon will be representative of the impact force of shot media on the part B in the absence of the pressure sensor 12. A protective layer may be added to the pressure sensor 12 to protect same for multi-session use. Wires may extend from the pressure sensors 12 to a processor, for wired transmission of pressure data. Alternatively, the pressure sensors 12 may incorporate a transmitter and associated electronics (including a battery) to transmit pressure data wirelessly to the processor.

The assembly 10 also has an assessment system 14 which includes modules in a processing unit, such as a personal computer, a laptop, a handheld device that receives data from the pressure sensors 12. The processing unit may communicate with the pressure sensors 12 by wired or wireless communication, the latter configuration being well suited for the assembly 10 featuring relative movement between the apparatus A and sample part B. In an embodiment, the assessment system 14 may communicate with the apparatus A to control same, e.g., start and stop shot-peening session in synchronization with the assessment, and control the position of the sample part B relative to the apparatus A.

Other components may include a camera or like imaging device 16 suitable for imaging shot-peened surfaces (i.e., appropriate zoom and resolution), and interfaces 18 such as a monitor to output calibration data, keyboard, mouse, etc for interactions with a user of the assembly 10.

According to an embodiment, the system 14 comprises an intensity calculator 40, a dispersion verifier 41, shot-peening parameter comparator 42, and a calibration assessor 43.

The intensity calculator 40 receives readings from the sensors 12 representative of pressure data positioned on the sample part B. The readings may be continuous through a shot-peening session (i.e., the shot peening of one part) and in real time, for real time assessment of the calibration of apparatus A. The intensity calculator 40 may therefore interpret the signal according to its format, and calculate the intensity from the pressure data, over time as the shot-peening session may not be instantaneous. In an embodiment, the intensity calculator 40 calculates the pressure in real-time over a period of time, thereby enabling the calculation of the intensity.

The dispersion verifier 41 may be present in the system 14 in instances where multiple sensors 12 are used. The dispersion verifier 41 may establish dispersion data based on a dispersion of shot media on the sample part in the shot-peening session using the real-time readings for each of the plurality of sensors. For example, if all of the sensors 12 produce some signal, the dispersion verifier 41 may determine that the shot-peening apparatus A performs a suitable dispersion of shot media on the sample part B. The dispersion verifier 41 may also establish data based on a dispersion of shot media on the sample part B by comparing the measured intensity calculated by the intensity calculator 40 to a shot-peening intensity threshold range for each of the sensors 12. Stated differently, if all of the pressure sensors 12 have each individually sensed an intensity within what is established as being acceptable, the shot media of the shot-peening apparatus A in the session perform suitable dispersion.

The shot-peening parameter comparator 42 compares the intensity measured by the intensity calculator 40 with a shot-peening intensity threshold range for the pressure sensor(s) 12. The shot-peening intensity threshold range may be evaluated in the designing of the part, for instance based on a desired intensity required to produce a given effect on the part.

The shot-peening intensity threshold range may also be established by recording shot-peening session parameters in Almen strip testing. For example, in the initial calibration of the shot-peening apparatus A, Almen strip testing may be used to calibrate the shot-peening apparatus A. Once calibration is reached with Almen strip testing (and session parameters are noted), a shot-peening session may be perfomed using the calibration settings with the sample part B and the sensor(s) 12. The pressure data and intensity is measured to quantify the calibration. The intensity value may then be established as a range based on the measured intensity. The shot-peening intensity threshold range may also be established by recording shot-peening session parameters of the previous calibration.

The calibration assessor 43 is used to confirm or refute a calibration of the shot-peening apparatus A. Calibration may be confirmed when the calibration assessor 43 receives confirmation that the intensity measured by the intensity calculator 40 is within the shot-peening intensity threshold range for the pressure sensor(s) 12, as compared by the shot-peening parameter comparator 42. Calibration may be confirmed when the calibration assessor 43 receives confirmation from the dispersion verifier 41 that suitable dispersion has been achieved.

The calibration assessor 43 may therefore stop the shot-peening apparatus A when calibration is confirmed. Additionally, the calibration assessor 43 may record parameters of the shot-peening session (e.g., duration, flow and pressure settings on the shot-peening apparatus A) when calibration is confirmed, for use in subsequent shot-peening sessions. The calibration assessor 43 may output calibration data featuring the measured intensity, measured pressure over time, shot-peening apparatus settings, dispersion value, as well as surface images of the sensors.

On the other hand, the calibration assessor 43 may refute calibration. For example, the calibration assessor 43 may identify that the expected duration of time for a session has exceeded. In an embodiment featuring a plurality of the sensors 12, the calibration assessor 43 may observe that only some of the sensors 12 are within the shot-peening intensity threshold range while others are not. For example, the calibration assessor 43 may observe from the comparison of the shot-peening parameter comparator 42 that one sensor 12 has been subjected to intensity beyond the shot-peening intensity threshold range. The calibration data may then be used by the user to adjust settings of the shot-peening apparatus A.

Referring now to FIG. 2, a method for assessing a calibration of a shot-peening apparatus, such as the shot-peening apparatus A, is set forth at 50. The method 50 may be formed by the system 14. The method 50 is described below with references to some of the components and modules of FIG. 1, as a non-limitative example. It is contemplated to perform the method 50 with another system.

According to 51, real-time readings are obtained from the pressure sensor(s) 12 positioned on the sample part B in a shot-peening session. This may include obtaining real-time readings for a plurality of the sensors 12 disposed at various locations on the sample part B, for instance wirelessly. A dispersion of shot media may be verified of shot media on the sample part B in the shot-peening session using the real-time readings for each of the plurality of sensors.

According to 52, pressure data is calculated in real-time for each of the sensor(s) 12 using the real-time readings.

According to 53, an intensity is measured for each of the sensors from the cumulated pressure data of 52.

According to 54, the measured intensity is compared to a shot-peening intensity threshold range for the sensor(s) 12. A dispersion of shot media on the sample part B in the shot-peening session may be established using the comparison of the measured intensity relative to the shot-peening intensity threshold range for each of the plurality of sensors 12. The shot-peening intensity threshold range may be obtained as established from recording shot-peening session parameters in Almen strip testing.

According to 55, a calibration of the shot-peening apparatus A is confirmed when the measured intensity is within the shot-peening intensity threshold range for sensor(s) 12. When a plurality of sensors 12 are used, the confirmation is based on a determination that the measured intensity is within the shot-peening intensity threshold range for each of the plurality of sensors. 55 may include refuteing a calibration when the pressure data is outside of the shot-peening pressure threshold range for the one or more of the sensors 12 after a time range of the shot-peening session as lapsed. 55 may also include automatically stopping the shot-peening session.

The shot-peening session parameters may be recorded after confirmation, for subsequent use in shot-peening sessions under this calibration, and/or for assessing the calibration of the shot-peening apparatus for another sample part.

The above description is meant to be exemplary only, and one skilled in the art will recognize that changes may be made to the embodiments described without departing from the scope of the invention disclosed. The assembly 10 forms an automated system with pressure sensors used to validate the peening intensity and the coverage in lieu of Almen test strip. Still other modifications which fall within the scope of the present invention will be apparent to those skilled in the art, in light of a review of this disclosure, and such modifications are intended to fall within the appended claims.

The invention claimed is:

1. A method for operating a shot-peening apparatus, comprising:
    shot peening a sample part in a shot-peening session;
    obtaining, with a processor operating a shot-peening apparatus, real-time pressure data from or based on data received from at least one sensor positioned on the sample part during the shot-peening session;
    calculating, with the processor operating the shot-peening apparatus, a shot-peening intensity from the pressure data;
    comparing, with the processor operating the shot-peening apparatus, the calculated intensity to a shot-peening intensity threshold range for the at least one sensor;
    confirming, with the processor operating the shot-peening apparatus, a calibration of the shot-peening apparatus when the calculated intensity is within the shot-peening intensity threshold range for the at least one sensor;
    upon receiving a confirmation of the calibration of the shot-peening apparatus, receiving a part in the shot-peening apparatus;
    shot peening the part in another shot-peening session without any sensor determining the shot-peening intensity;
    repeating shot-peening sessions with the shot-peening apparatus for a plurality of parts without any sensor determining the shot-peening intensity.

2. The method according to claim 1, wherein obtaining real-time pressure data comprises obtaining real-time readings for a plurality of the sensor disposed at various locations on the sample part; and wherein confirming a calibration of the shot-peening apparatus is when the calculated intensity is within the shot-peening intensity threshold range for each of the plurality of sensors.

3. The method according to claim 2, further comprising verifying a dispersion of shot media on the sample part in the shot-peening session using the real-time readings for each of the plurality of sensors.

4. The method according to claim 2, wherein comparing the calculated intensity comprising verifying a dispersion of shot media on the sample part in the shot-peening session by comparing the calculated intensity to a shot-peening intensity threshold range for each of the plurality of sensors.

5. The method according to claim 4, wherein confirming a calibration comprises refuting a calibration when the pressure data is outside of the shot-peening pressure threshold range for at least one of the plurality of sensors after a time range of the shot-peening session as lapsed.

6. The method according to claim 1, wherein confirming a calibration comprises refuting a calibration when the calculated intensity is outside of the shot-peening intensity threshold range for the at least one sensor after a time range of the shot-peening session as lapsed.

7. The method according to claim 1, wherein obtaining real-time pressure data comprises obtaining real-time pressure data wirelessly from the at least one sensor.

8. The method according to claim 1, wherein confirming the calibration of the shot-peening apparatus comprises automatically stopping the shot-peening session.

9. The method according to claim 1, further comprising recording shot-peening session parameters after confirmation, for subsequent use in at least one of shot-peening sessions and assessing the calibration of the shot-peening apparatus for another sample part.

10. The method according to claim 1, wherein comparing the measured intensity comprises obtaining the shot-peening intensity threshold range as established from recording shot-peening session parameters in Almen strip testing.

11. The method according to claim 1, further comprising positioning the at least one sensor adjacent a part to be shot-peened, and shot peening the part and the at least one sensor.

12. A shot-peening system comprising:
    a shot-peening apparatus for performing shot peening;
    at least one sensor outputting pressure data from shot of the shot-peening apparatus;
    a processor unit for operating the shot-peening apparatus, the processor unit having
    an intensity calculator for receiving real-time pressure data from the at least one sensor positioned adjacent the part in the shot-peening session, and for calculating the intensity from the pressure data,
    a shot-peening parameter comparator for comparing the calculated intensity with a shot-peening intensity threshold range for the at least one sensor and
    a calibration assessor for confirming a calibration of the shot-peening apparatus when the calculated intensity is within the shot-peening intensity threshold range for the at least one sensor;
    wherein the processor unit controls the shot-peening apparatus during shot-peening sessions for a plurality of parts without any sensor determining the shot-peening intensity upon receiving a confirmation of the calibration of the shot-peening apparatus from the calibration assessor.

13. The system according to claim 12, wherein the intensity calculator receives the real-time pressure data from a plurality of the sensor distributed on the sample; the calibration assessor producing calibration data comprising the comparison for all of the plurality of sensors.

14. The system according to claim 13, further comprising a dispersion verifier for establishing data based on a dispersion of shot media on the part in the shot-peening session using the real-time pressure data for each of the plurality of sensors, the calibration assessor confirming the calibration based on the data from the dispersion verifier.

15. The system according to claim 12, further comprising a dispersion verifier for establishing data based on a dispersion of shot media on the part in the shot-peening session by comparing the calculated intensity to a shot-peening intensity threshold range for each of the plurality of sensors, the calibration assessor confirming the calibration based on the data from the dispersion verifier.

16. The system according to claim 12, wherein the calibration assessor automatically stops the shot-peening session upon confirming a calibration.

17. The system according to claim 12, wherein the calibration assessor records parameters of the shot-peening session when calibration is confirmed, for use in subsequent shot-peening sessions.

18. The system according to claim 12, wherein the calibration assessor records parameters of the shot-peening session subsequent use in assessing the calibration of the shot-peening apparatus.

19. The system according to claim 12, wherein the shot-peening parameter comparator obtains the shot-peening intensity threshold range as established from recording shot-peening session parameters in Almen strip testing.

20. The system according to claim 12, wherein the calibration assessor receives and produces surface images of the at least one sensor.

\* \* \* \* \*